United States Patent
Davis et al.

(10) Patent No.: US 6,701,449 B1
(45) Date of Patent: Mar. 2, 2004

(54) METHOD AND APPARATUS FOR MONITORING AND ANALYZING NETWORK APPLIANCE STATUS INFORMATION

(75) Inventors: Daniel A. Davis, New Brunswick, NJ (US); Xing Hai, Somerville, NJ (US)

(73) Assignee: Ciprico, Inc., Plymouth, MN (US)

( * ) Notice: Subject to any disclaimer, the term of this patent is extended or adjusted under 35 U.S.C. 154(b) by 0 days.

(21) Appl. No.: 09/553,367

(22) Filed: Apr. 20, 2000

(51) Int. Cl.$^7$ ................................................ G06F 11/00
(52) U.S. Cl. ................................. 714/4; 714/9; 714/45; 714/47
(58) Field of Search ........................ 714/4, 9, 45, 47

(56) References Cited

U.S. PATENT DOCUMENTS

| | | | |
|---|---|---|---|
| 4,430,710 A | 2/1984 | Catiller et al. | 709/250 |
| 4,692,918 A | 9/1987 | Elliott et al. | 370/85 |
| 4,942,579 A | 7/1990 | Goodlander et al. | 371/51 |
| 5,357,626 A | 10/1994 | Johnson et al. | 395/500 |
| 5,430,866 A | 7/1995 | Lawrence et al. | 395/575 |
| 5,477,544 A | 12/1995 | Botelho | 714/712 |
| 5,530,845 A | 6/1996 | Hiatt et al. | 703/27 |
| 5,590,276 A | 12/1996 | Andrews | 395/182.04 |
| 5,592,530 A | 1/1997 | Brockman et al. | 379/34 |
| 5,617,530 A | 4/1997 | Stallmo et al. | 395/182.04 |
| 5,696,895 A | 12/1997 | Hemphill et al. | 395/182.02 |
| 5,757,642 A * | 5/1998 | Jones | 700/5 |
| 5,764,920 A * | 6/1998 | Cook et al. | 709/238 |
| 5,815,649 A | 9/1998 | Utter et al. | 395/112.04 |
| 5,918,021 A | 6/1999 | Aditya | 395/200.65 |
| 5,931,916 A | 8/1999 | Barker et al. | 709/239 |
| 5,938,732 A | 8/1999 | Lim et al. | 709/229 |
| 5,944,838 A | 8/1999 | Jantz | 714/6 |
| 6,073,218 A | 6/2000 | DeKoning et al. | 711/150 |
| 6,112,249 A * | 8/2000 | Bader et al. | 709/239 |
| 6,119,244 A * | 9/2000 | Schoenthal et al. | 714/4 |
| 6,233,704 B1 | 5/2001 | Scott et al. | 714/717 |
| 6,275,953 B1 | 8/2001 | Vahalia et al. | 714/11 |
| 6,308,282 B1 | 10/2001 | Huang et al. | 714/4 |
| 6,335,932 B2 * | 1/2002 | Kadambi et al. | 370/391 |
| 6,341,356 B1 | 1/2002 | Johnson et al. | 714/4 |
| 6,363,462 B1 | 3/2002 | Bergsten | 711/162 |
| 6,393,483 B1 * | 5/2002 | Latif et al. | 709/226 |

FOREIGN PATENT DOCUMENTS

| | | |
|---|---|---|
| EP | 0632379 | 1/1995 |
| EP | 0942554 | 9/1999 |
| WO | WO 99/17201 | 4/1999 |

OTHER PUBLICATIONS

"Dual Active Redundant Controllers: The Highroad to Performance and Availability". Rod DeKoning and Scott Hubbard, RAB, Computer Technology Review, No. 3, Mar. 1995.

* cited by examiner

*Primary Examiner*—Robert Beausoliel
*Assistant Examiner*—Emerson Puente
(74) *Attorney, Agent, or Firm*—Fredrikson & Byron, PA

(57) ABSTRACT

A method and apparatus for identifying a faulty device through generation of status messages within each device and monitoring the status messages of each other device. If status messages are not properly received, the apparatus invokes a fault analysis routine to identify the problem. The status messages are transmitted between the devices using a plurality of communications channels.

15 Claims, 12 Drawing Sheets

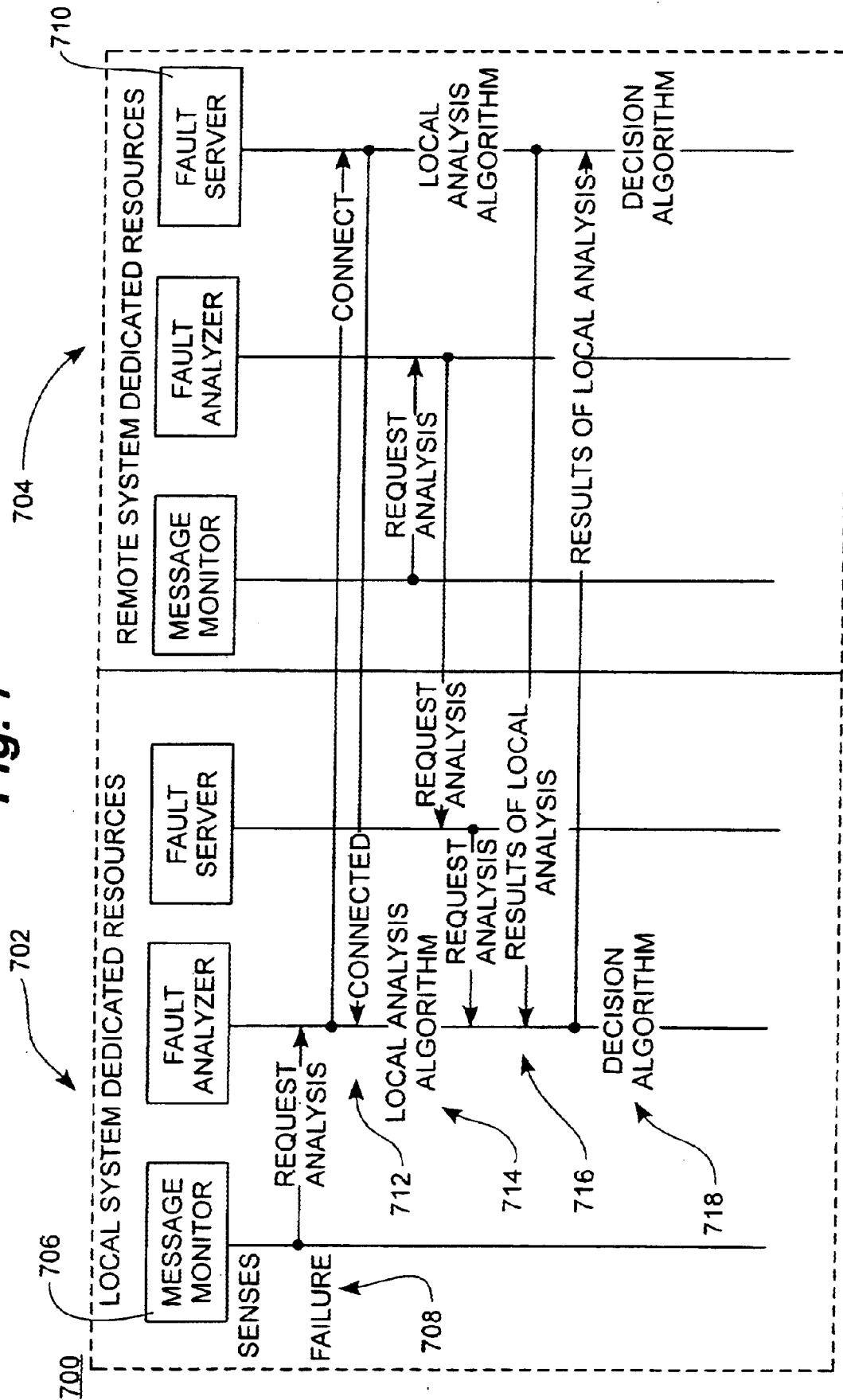

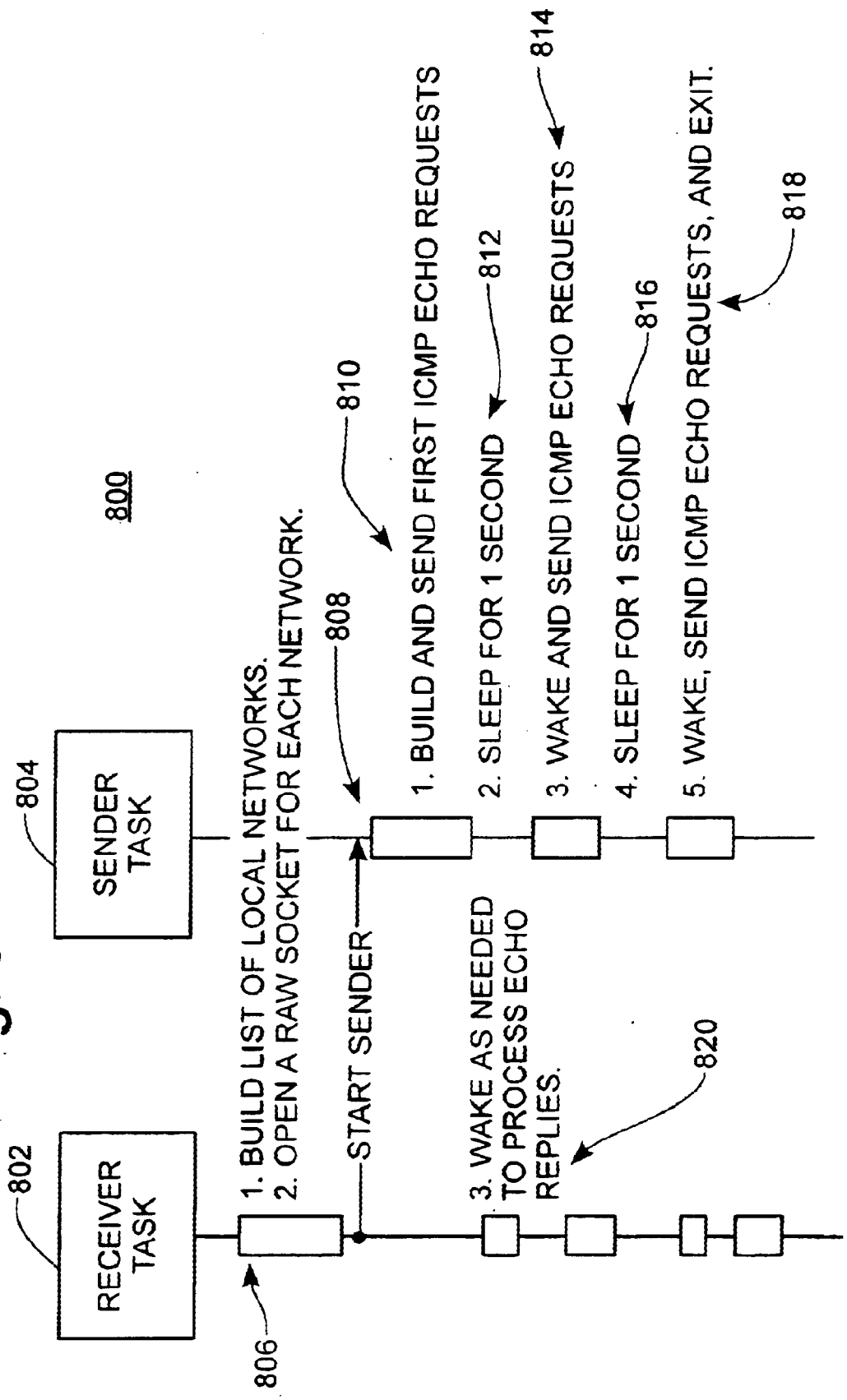

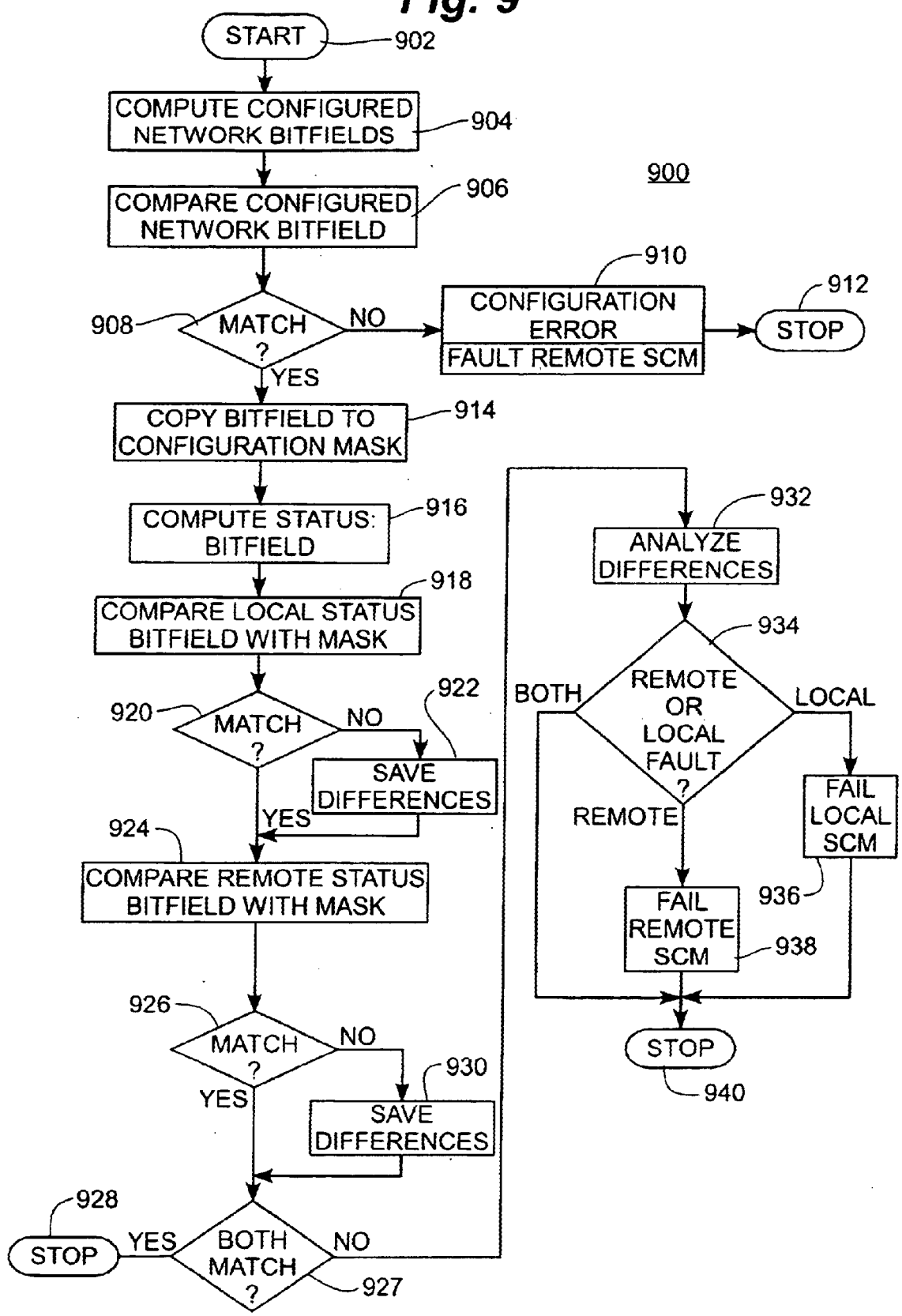

METHOD AND APPARATUS FOR MONITORING AND ANALYZING NETWORK APPLIANCE STATUS INFORMATION

BACKGROUND OF THE DISCLOSURE

1. Field of the Invention

The invention relates to network appliances and, more particularly, the invention relates to a method and apparatus for monitoring and analyzing network appliance status information.

2. Description of the Background Art

Data processing and storage systems that are connected to a network to perform task specific operations are known as network appliances. Network appliances may include a general purpose computer that executes particular software to perform a specific network task, such as file server services, domain name services, data storage services, and the like. Because these network appliances have become important to the day-to-day operation of a network, the appliances are generally required to be fault-tolerant. Typically, fault tolerance is accomplished by using redundant appliances, such that, if one appliance becomes disabled, another appliance takes over its duties on the network. However, the process for transferring operations from one appliance to another leads to a loss of network information. For instance, if a pair of redundant data storage units are operating on a network and one unit fails, the second unit needs to immediately perform the duties of the failed unit. However, the delay in transitioning from one storage unit to another may cause a loss of some data. One factor in performing a rapid transition between appliances is to enable each redundant appliance to monitor the health of another redundant appliance. Monitoring is accomplished through a single link that informs another appliance of a catastrophic failure of a given appliance. Such notification causes another appliance to take over the network functions that were provided by the failed appliance. However, such a single link is prone to false failure notifications and limited diagnostic information transfer. For example, if the link between appliances is severed, the system may believe the appliance has failed when it has not.

Therefore, a need exists in the art for an improved method and apparatus for monitoring and analyzing status information of network appliances.

SUMMARY OF THE INVENTION

The disadvantages associated with the prior art are overcome by the present invention of a method and apparatus for performing fault-tolerant network computing using a "heartbeat" generation and monitoring technique. The apparatus comprises a pair of network appliances coupled to a network. The appliances interact with one another to detect a failure in one appliance and instantly transition operations from the failed appliance to a functional appliance. Each appliance monitors the status of another appliance using multiple, redundant communication channels.

In one embodiment of the invention, the apparatus comprises a pair of storage controller modules (SCM) that are coupled to a storage pool, i.e., one or more data storage arrays. The storage controller modules are coupled to a host network (or local area network (LAN)). The network comprises a plurality of client computers that are interconnected by the network. Each SCM comprises a status message generator and a status message monitor. The status message generators produce periodic status messages (referred to as heartbeat messages) on multiple communications channels. The status message monitors monitor all the communications channels and analyze any heartbeat messages to detect failed communications channels. Upon detecting a failed channel, the monitor executes a fault analyzer to determine the cause of a fault and a remedy.

BRIEF DESCRIPTION OF THE DRAWINGS

The teachings of the present invention can be readily understood by considering the following detailed description in conjunction with the accompanying drawings, in which:

FIG. 7 depicts an event trace diagram of the distributed fault analysis routine;

FIG. 8 depicts an event trace diagram of the local fault analysis routine; and

FIG. 9 depicts a flow diagram of the decision routine.

To facilitate understanding, identical reference numerals have been used, where possible, to designate identical elements that are common to the figures.

DETAILED DESCRIPTION

One embodiment of the invention is a modular, high-performance, highly scalable, highly available, fault tolerant network appliance that is illustratively embodied in a data storage system that uses the status messaging (heartbeat) technique to identify and correct appliance faults.

Figure 1:
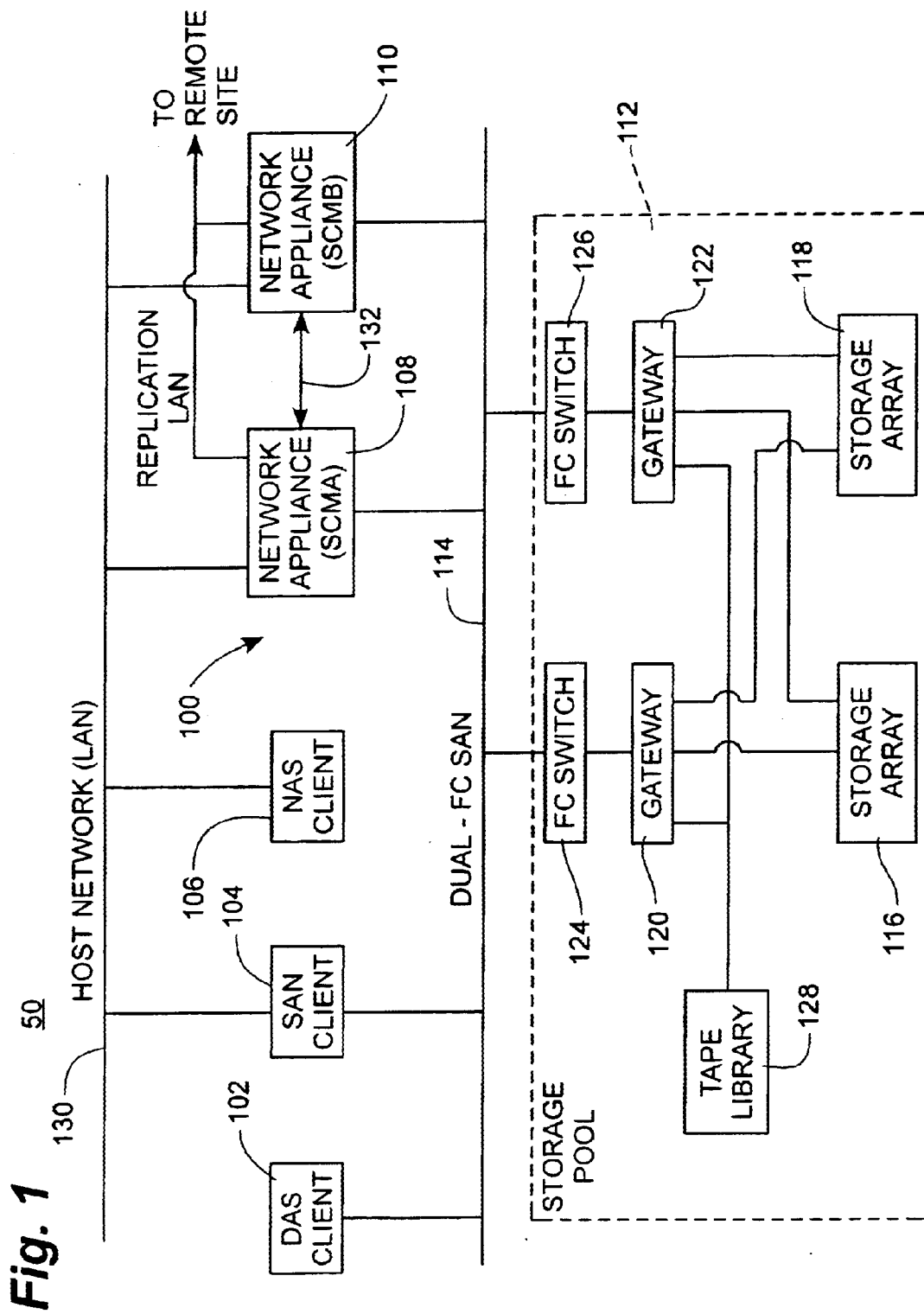
FIG. 1 depicts a block diagram of one embodiment of the present invention.

FIG. 1 depicts a data processing system 50 comprising a plurality of client computers 102, 104, and 106, a host network 130, and a storage system 100. Although summarily described herein as a platform within which the status monitoring technique of the present invention operates, the storage system 100 is described in detail in U.S. patent application Ser. No. 09/552,781, filed simultaneously herewith, which is incorporated herein by reference.

The storage system 100 comprises a plurality of network appliances 108 and 110 and a storage pool 112. The plurality of clients comprise one or more of a network attached storage (NAS) client 102, a direct attached storage (DAS) client 104 and a storage area network (SAN) client 106. The plurality of network appliances 108 and 110 comprise a storage controller module A (SCM A) 108 and storage controller module B (SCM B) 110. The storage pool 112 is coupled to the storage controller modules 108, 110 via a fiber channel network 114. One embodiment of the storage pool 112 comprises a pair of storage arrays 116, 118 that are coupled to the fiber channel network 114 via a pair of fiber channel switches 124, 126 and a communications gateway 120, 122. A tape library 128 is also provided for storage backup.

In storage system 100, the DAS client directly accesses the storage pool 112 via the fiber channel network 114, while the SAN client accesses the storage pool 112 via both the LAN 130 and the fiber channel network 114. For example, the SAN client 104 communicates via the LAN with the SCMs 108, 110 to request access to the storage pool 112. The SCMs inform the SAN client 104 where in the storage arrays the requested data is located or where the data from the SAN client is to be stored. The SAN client 104 then directly accesses a storage array using the location information provided by the SCMs. The NAS client 106 only communicates with the storage pool 112 via the SCMs 108, 110. Although a fiber channel network is depicted as one way of connecting the SCMs 108, 110 to the storage pool 112, the connection may be accomplished using any form of data network protocol such as SCSI, HIPPI, SSA and the like.

The storage system is a hierarchy of system components that are connected together within the framework established by the system architecture. The major active system level components are:

SCM—Storage Controller Module

SDM—Storage Device Module (Storage Pool)

The system architecture provides an environment in which each of the storage components that comprise the storage system embodiment of the invention operate and interact to form a cohesive storage system.

The architecture is centered around a pair of SCMs 108 and 110 that provide storage management functions. The SCMs are connected to a host network that allows the network community to access the services offered by the SCMs 108, 110. Each SCM 108, 110 is connected to the same set of networks. This allows one SCM to provide the services of the other SCM in the event that one of the SCMs becomes faulty. Each SCM 108, 110 has access to the entire storage pool 112. The storage pool is logically divided by assigning a particular storage device (array 116 or 118) to one of the SCMs 108, 110. A storage device 116 or 118 is only assigned to one SCM 108 or 110 at a time. Since both SCMs 108, 110 are connected to the entirety of the storage pool 112, the storage devices 116, 118 assigned to a faulted SCM can be accessed by the remaining SCM to provide its services to the network community on behalf of the faulted SCM. The SCMs communicate with one another via the host networks. Since each SCM 108, 110 is connected to the same set of physical networks as the other, they are able to communicate with each other over these same links. These links allow the SCMs to exchange configuration information with each other and synchronize their operation.

The host network 130 is the medium through which the storage system communicates with the clients 104 and 106. The SCMs 108, 110 provide network services such as NFS and HTTP to the clients 104, 106 that reside on the host network 130. The host network 130 runs network protocols through which the various services are offered. These may include TCP/IP, UDP/IP, ARP, SNMP, NFS, CIFS, HTTP, NDMP, and the like.

From an SCM point of view, its front-end interfaces are network ports running file protocols. The back-end interface of each SCM provides channel ports running raw block access protocols.

The SCMs 108, 110 accept network requests from the various clients and process them according to the command issued. The main function of the SCM is to act as a network-attached storage (NAS) device. It therefore communicates with the clients using file protocols such as NFSv2, NFSv3, SMB/CIFS, and HTTP. The SCM converts these file protocol requests into logical block requests suitable for use by a direct-attach storage device.

The storage array on the back-end is a direct-attach disk array controller with RAID and caching technologies. The storage array accepts the logical block requests issued to a logical volume set and converts it into a set of member disk requests suitable for a disk drive.

The redundant SCMs will both be connected to the same set of networks. This allows either of the SCMs to respond to the IP address of the other SCM in the event of failure of one of the SCMS. The SCMs support 10BaseT, 100BaseT, and 1000BaseT. Optionally, the SCMs are able to communicate with each other through a dedicated inter-SCM network 132. This optional dedicated connection is at least a 100BaseT Ethernet or a serial connection using a protocol such as RS-232.

The SCMs 108, 110 connect to the storage arrays 116, 118 through parallel differential SCSI (not shown) or a fiber channel network 114. Each SCM 108, 110 may be connected through their own private SCSI connection to one of the ports on the storage array.

The storage arrays 116, 118 provide a high availability mechanism for RAID management. Each of the storage arrays provides a logical volume view of the storage to a respective SCM. The SCM does not have to perform any volume management.

The status monitor (SM) (also referred to herein as a heartbeat monitor) is responsible for monitoring the status messages of the remote SCM to determine if the remote SCM is alive and operating properly. If the SM determines that the remote SCM is not operating correctly, it will notify the system software to initiate a failover operation. The SM employs redundant channels in order to transmit and receive status messages to and from other SCMs.

Figure 2:
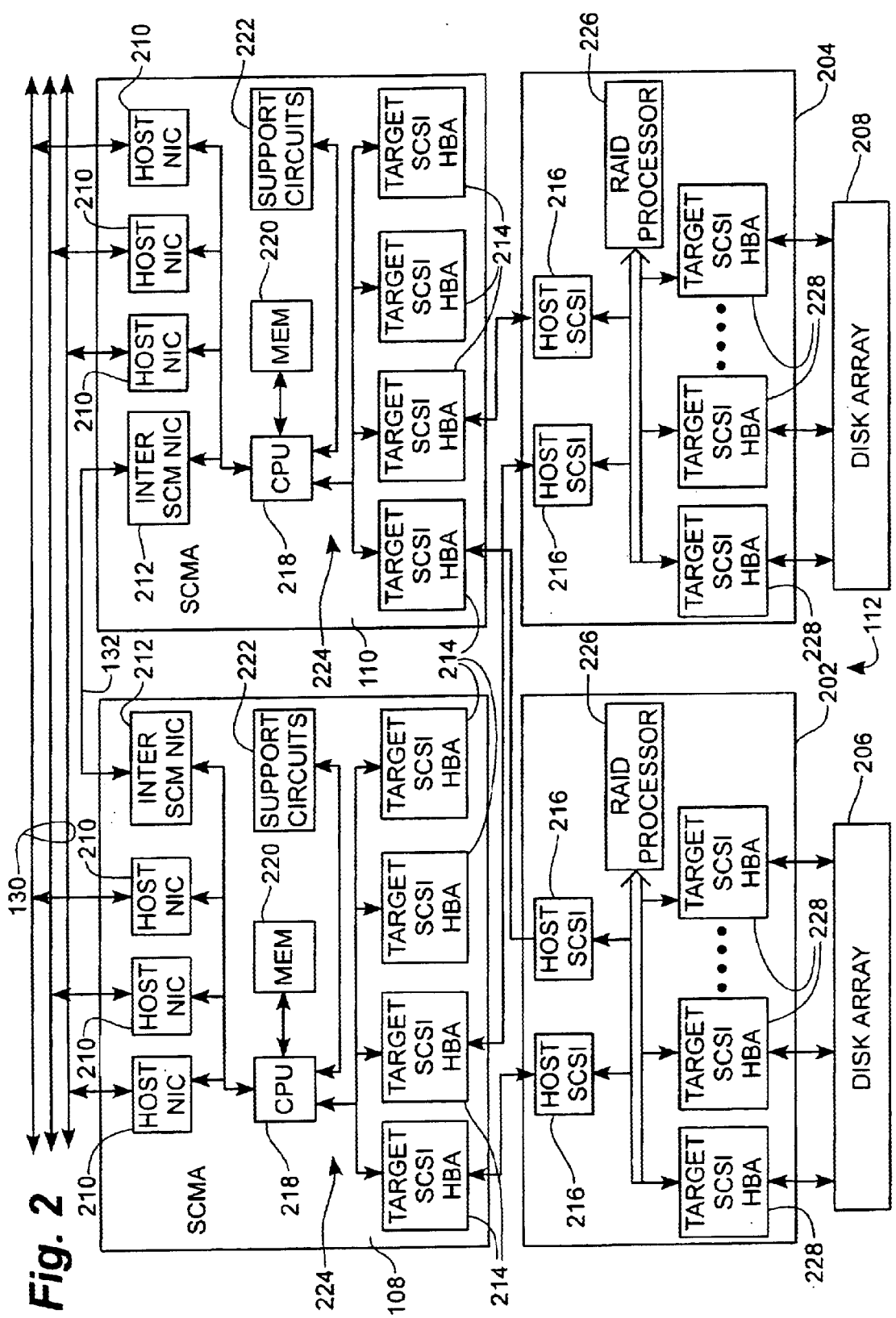
FIG. 2 depicts a functional block diagram of the status monitoring system of the pair of storage controller modules.

FIG. 2 depicts an embodiment of the invention having the SCMs 108, 110 coupled to the storage arrays 116, 118 via SCSI connections 200. Each storage array 116, 118 comprises an array controller 202, 204 coupled to a disk array 206, 208. The array controllers 202, 204 support RAID techniques to facilitate redundant, fault tolerant storage of data. The SCMs 108, 110 are connected to both the host network 130 and to array controllers 202, 204. Note that every host network interface card (NIC) 210 connections on one SCM is duplicated on the other. This allows a SCM to assume the IP address of the other on every network in the event of a SCM failure. The NICs 212 in each SCM 108, 110 are optionally dedicated for communications between the two SCMs.

On the target channel side of the SCM, each SCM 108, 110 is connected to an array controller 202, 204 through its own host SCSI port 214. All volumes in each of the storage arrays 202, 204 are dual-ported through SCSI ports 216 so that access to any volume is available to both SCMs 108, 110.

The SCM 108, 110 is based on a general purpose computer (PC) such as a ProLiant 1850R manufactured by COMPAQ Computer Corporation. This product is a Pentium PC platform mounted in a 3U 19" rack-mount enclosure. The SCM comprises a plurality of network interface controls 210, 212, a central processing unit (CPU) 218, a memory unit 220, support circuits 222 and SCSI parts 214. Communication amongst the SCM components is supported by a PCI bus 224. The SCM employs, as a support circuit 222, dual hot-pluggable power supplies with separate AC power connections and contains three fans. (One fan resides in each of the two power supplies). The SCM is, for example, based on the Pentium III architecture running at 600 MHz and beyond. The PC has 4 horizontal mount 32-bit 33 MHz PCI slots. As part of the memory (MEM) unit 220, the PC comes equipped with 128 MB of 100 MHz SDRAM standard and is upgradable to 1 GB. A Symbios 53c8xx series chipset resides on the 1850R motherboard that can be used to access the boot drive.

The SCM boots off the internal hard drive (also part of the memory unit 220). The internal drive is, for example, a SCSI drive and provides at least 1 GB of storage. The internal boot device must be able to hold the SCSI executable image, a mountable file system with all the configuration files, HTML documentation, and the storage administration application. This information may consume anywhere from 20 to 50 MB of disk space.

In a redundant SCM configuration, the SCM's 108, 110 are identically equipped in at least the external interfaces and the connections to external storage. The memory configuration should also be identical. Temporary differences in configuration can be tolerated provided that the SCM with the greater number of external interfaces is not configured to use them. This exception is permitted since it allows the user to upgrade the storage system without having to shut down the system.

The storage device module (storage pool 112) is an enclosure containing the storage arrays 116 and 118 and provides an environment in which they operate.

One example of a disk array 116, 118 that can be used with the embodiment of the present invention is the Synchronix 2000 manufactured by ECCS, Inc. of Tinton Falls, N.J. The Synchronix 2000 provides disk storage, volume management and RAID capability. These functions may also be provided by the SCM through the use of custom PCI I/O cards.

Depending on the I/O card configuration, multiple Sychronix 2000 units can be employed in this storage system. In one illustrative implementation of the invention, each of the storage arrays 116, 118 uses 4 PCI slots in a 1 host/3 target configuration, 6 SCSI target channels are available allowing six Synchronix 2000 units each with thirty 50 GB disk drives. As such, the 180 drives provide 9 TB of total storage. Each storage array 116, 118 can utilize RAID techniques through a RAID processor 226 such that data redundancy and disk drive fault tolerance is achieved.

Figure 3:
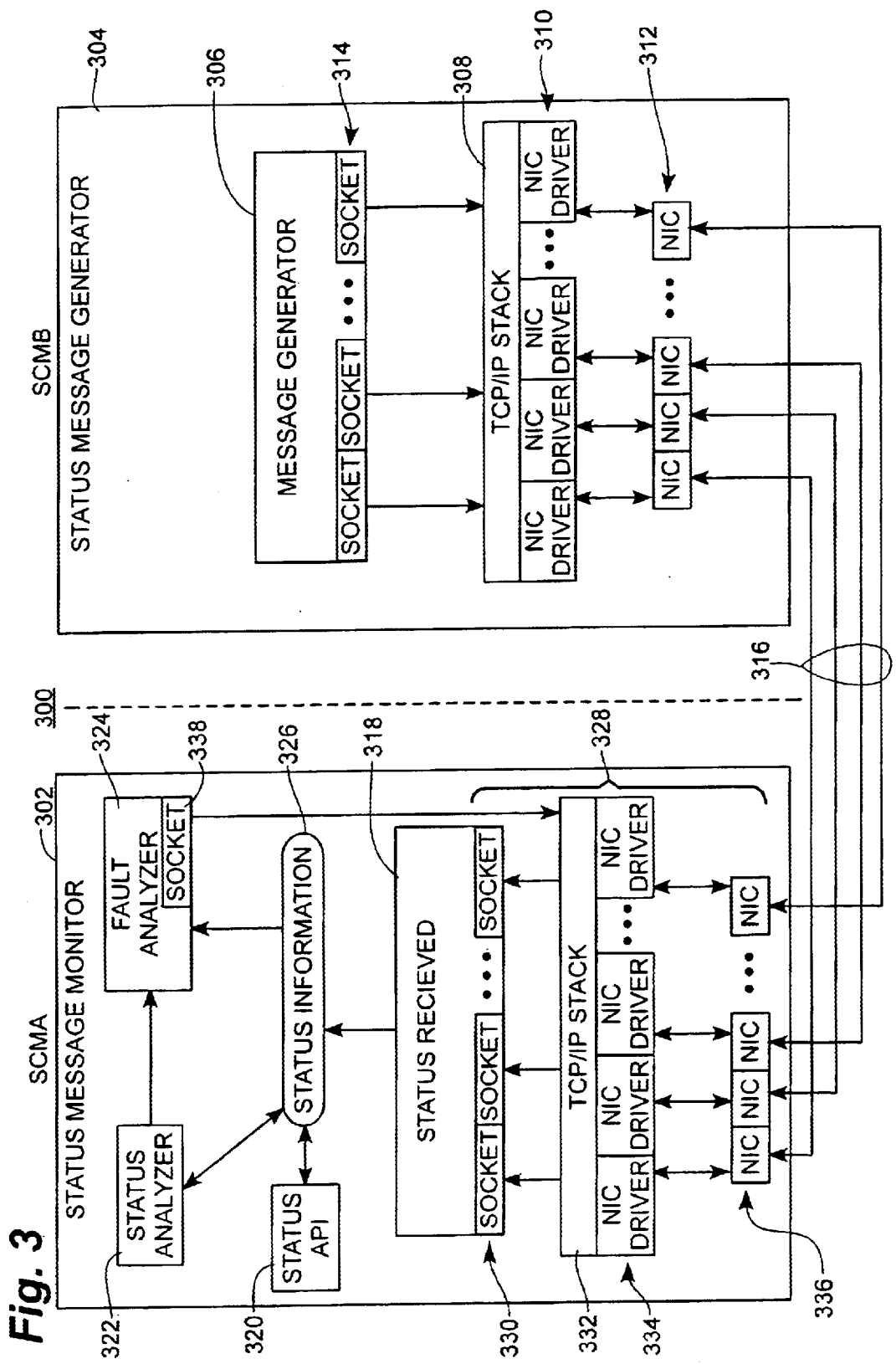
FIG. 3 depicts a functional block diagram of a status message monitor and status message generator.

FIG. 3 depicts a block diagram of an illustrative embodiment of a status monitor system 300. Specifically, the SMS 300 is divided into a status message generator 302 and a status message monitor 304. Each SCM employs both a generator and a monitor i.e., the generator of one SCM communicates with a monitor of another SCM. The generator 302 comprises a message generator 306, a TCP/IP stack 308, a plurality of NIC drivers 310 and a plurality of NICs 312. The status message generator 304 is responsible for issuing status messages on a periodic basis. The messages are coupled through a plurality of sockets 314 to be propagated on a plurality of network paths 316. This generator 304 issues these messages, for example, once every second, across all available network channels to the monitor 302 in the other SCM. Such multi-channel broadcast allows a verification of all network channels to ensure that both SCMs are connected to all the networks. This is important because, if a SCM failure occurs, the remaining SCM must have access to all resources connected to the failed SCM. The generator 304 also updates the status information which contains the status of all the network channels.

The status message monitor 302 comprises a status message receiver 318, a status API 320, a status analyzer 322, a fault analyzer 324, a status information database 326, and a network communications portion 328. The network communications portion 328 comprises a plurality of sockets 330, a TCI/IP stack 332, a plurality of NIC drivers 334 and NICs 336. The monitor 302 listens for status messages on the set of sockets 330 connected to all the available network interfaces. In addition, the monitor 302 performs analysis on the state of the various network channels over which status messages are received. The monitor 302 updates the status information database 326 every time a status message is received from the generator 304 running on another SCM. The status information database 326 contains the current state of each network port e.g., failed or operative. The status analyzer 322 checks the status information database 326 on a periodic basis. The status analyzer 322 is looking for network ports that are not being updated. An un-updated network channel status indicates that some sort of fault has occurred. Upon detection of an un-updated channel, the status analyzer 322 calls the fault analyzer 324 to analyze the situation. The fault analyzer 324 is also responsible for updating the network port objects through a socket 338 coupled to the TCP/IP stack 332 and the remote SCM configuration object. The status API 320 allows the status of the status monitor 320 to be returned. Information regarding the monitor 302 as well as the network channel state and SCM state are available through the status API.

The API allows another task to inquire about the status of the network connections and the remote SCM. The API returns a GOOD/BAD indication of each network connection as well as for the remote SCM. Statistical information must also be returned regarding number of packets sent/received, number of missing packets and on which network connections.

If no status messages are being received from the remote SCM, the SCM assumes that the remote SCM has failed.

If one of the host network ports is not working properly, status messages issued over the inoperative channel are not received by the status message monitor 302. An event is logged to an event notification service. If the dedicated SCM channel is not operational, no actions are taken other than the notification of the event. If one of the Host network connections has become inoperative, the status message monitor system 300 attempts to determine the location of the fault as a SCM network port, the cabling between either SCM and the network, or the network is down (hub has failed). This analysis is accomplished by executing the fault analyzer 324.

Figure 4:
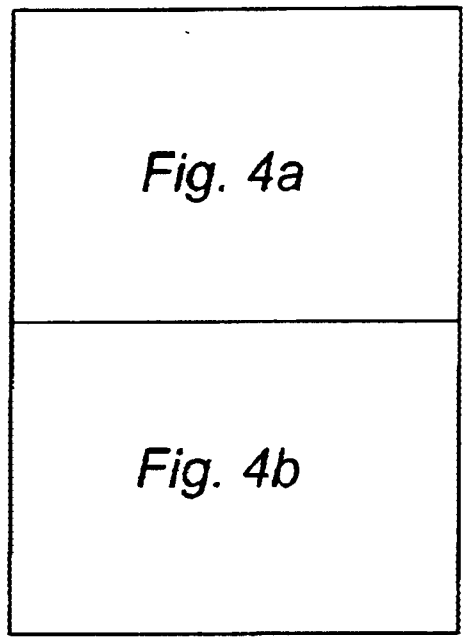
FIG. 4 depicts a flow diagram of the operation of the status message monitor.

FIG. 4 is a flow diagram that depicts the operation of the fault monitoring process 400. This figure depicts the operation of the monitoring process for a single communication channel. In practice, an SCM executes a plurality of these procedures simultaneously. Additionally, FIG. 4 is described as being executed in the local SCM. A similar process is executed in the remote SCM.

The process begins at block 402 and proceeds to step 404. At step 404, the local SCM gets the network channel configuration from a local configuration database. Once the configuration information is received, the local SCM knows the remote SCM's configuration of network ports. At step 406, the routine queries whether the channel is configured. If the channel is not configured, the routine proceeds to step 408 and stops. If the channel is configured, the routine proceeds to step 410 to wait for a socket connection to communicate to a remote SCM. If, at step 412, a socket connection is not created, the routine queries whether the channel has failed. If the channel is not deemed to have failed, then, the local SCM continues to wait for a socket connection, i.e., the process returns to step 410. After a predefined number of failed attempts, the query at step 414 is affirmatively answered and the local SCM will invoke a fault analyzer at step 438.

Once a connection is established between the local and remote SCMs, the server of the local SCM waits on several sockets using the SELECT command. The local SCM monitors a plurality of sockets (communications channels), for example, five channels on which status messages may appear. Messages are generated by the remote SCM every second and those messages are transmitted on all communication channels. As such, each second the local SCM should receive a plurality of identical status messages. Each status message comprises a sequence number and a verifiable digital signature (an agreed upon token or checksum) that uniquely identifies the status message and validates the message.

At step 416, a message counter is initialized to a predefined value, e.g., 20, and the channel is marked open. At step 422, every time a status message is received on the channel handled by this particular routine 400, the sequence number of the message is stored and the count information is incremented by the difference between the current sequence number and the last sequence number that was received. This difference is generally one; however, if a status message was lost in the network, then the difference could be greater than one. The time-out value is 1 second, i.e., if a status message is not received within 1 second, it is deemed missed. If no message is received, the process 400 waits for the next message at step 422. Every second, the status analyzer function (shown as block 420) is executed to adjust the status information, i.e., the count value. The status analyzer expects one message every second. For each message received, at step 424, the counter is incremented by the difference in the sequence numbers.

At step 425, the process 400 queries whether a predefined period has passed (e.g., five seconds). If the query at step 4252 is negatively answered, the routine proceeds to step 422 and awaits the next status message. Every five seconds, the query at step 425 is affirmatively answered and the status analyzer 420 queries, at step 426, whether the count value is zero. If the count value is zero, the channel is deemed failed and the status analyzer 420 invokes the fault analyzer at step 438. If the counter value is not zero, then the status analyzer 420 proceeds from step 426 to step 428. At step 428, the status analyzer queries whether the counter has attained a maximum value (MAX). If the answer is affirmative, then step 430 sets the counter value to the maximum value (MAX). In one embodiment of the invention, the maximum counter value is 48. If the query of step 428 is negatively answered or the counter's set to the maximum value, the status analyzer then decrements the counter value by DECR, e.g., four. As such, if the counter is at its maximum value, no status messages must be received for 60 seconds to achieve a zero count.

At step 434, the status analyzer 420 queries whether the counter value is less than zero. If the value is less than zero, the counter value is set to zero at step 436. Otherwise, the status analyzer returns to step 422 from step 434.

Figure 5:
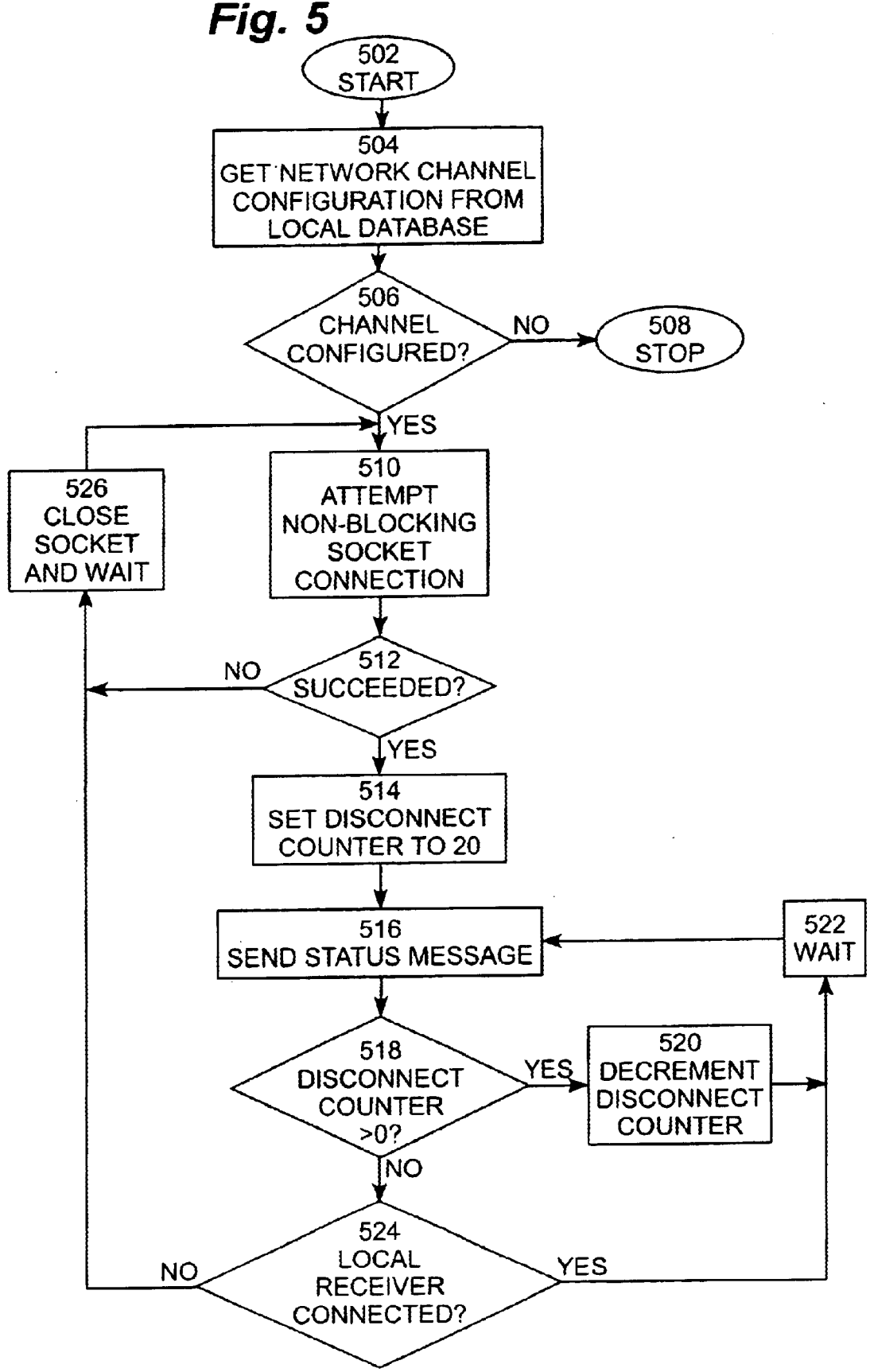
FIG. 5 depicts a flow diagram of the status message generator.
Figure 6A:
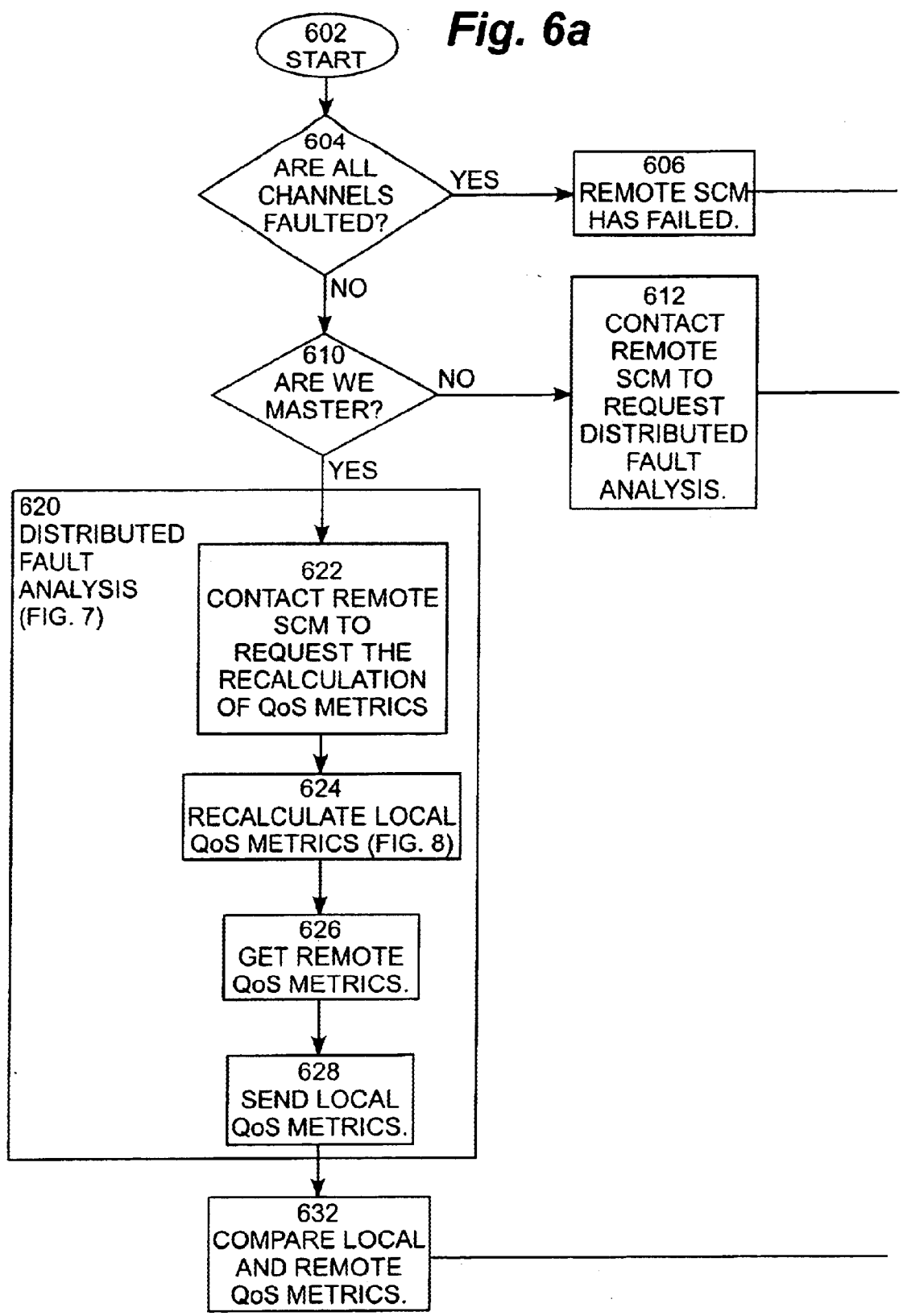
Figure 6B:
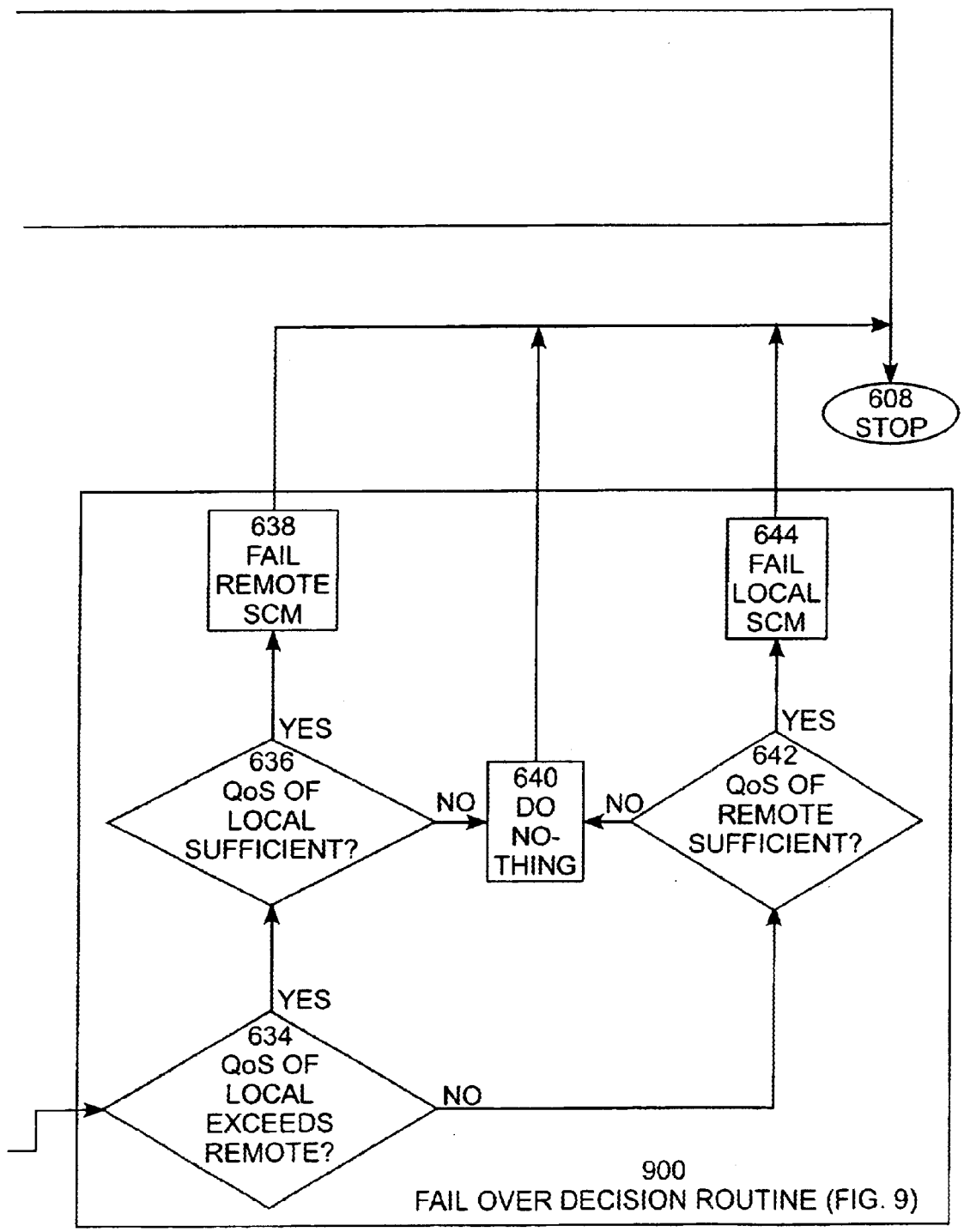

FIG. 5 is a flow diagram of a status message generator routine 500 that is executed in the remote SCM i.e., to send status messages to the status message monitor of FIG. 4. This routine 500 is executed for each channel through which communications to the local SCM can be performed. The process begins at step 502 and proceeds to step 504. At step 504, the routine 500 gets the network channel configuration information from the local database. A step 506, the routine queries if the channel is configured. If the channel is not configured, the routine proceeds to step 508 and stops. If the channel is configured the routine proceeds from step 508 to step 510.

At step 510, a non-blocking socket connection is attempted. At step 512, the routine queries whether the socket connection succeeded. If not, the routine 500 proceeds to step 526, closes the socket and waits a predefined period before attempting another socket connection.

If the socket connection was successful, the routine 500 proceeds to step 514. At step 514, a disconnect counter is initialized to a predefined count value, e.g., 20. At step 516, a status message is sent via the open socket. At step 518,the routine 500 queries whether the counter value is greater than zero. If the counter value is greater than zero, the counter value is decremented at step 520. The counter is, for example, decremented by one. At step 522, the routine 500 then waits a predefined period (e.g., one second) before returning to step 516 to send another status message. If the counter value has attained a count of zero, the routine 500 proceeds from step 518 to step 524 to determine if the local receiver connection has failed. If the query at step 524 is affirmatively answered, the routine proceeds to step 522 to wait and then to step 516 to send another status message. If, on the other hand, the local receiver is not connected, then the routine 500 proceeds to step 526 to close the socket, wait and then attempt to open a new socket.

Figure 6:
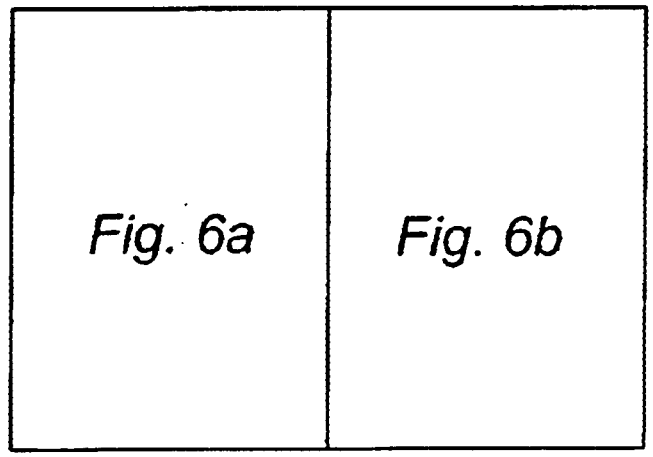
FIG. 6 depicts a high flow diagram of the fault analysis routine (fault analyzer)
Figure 4A:
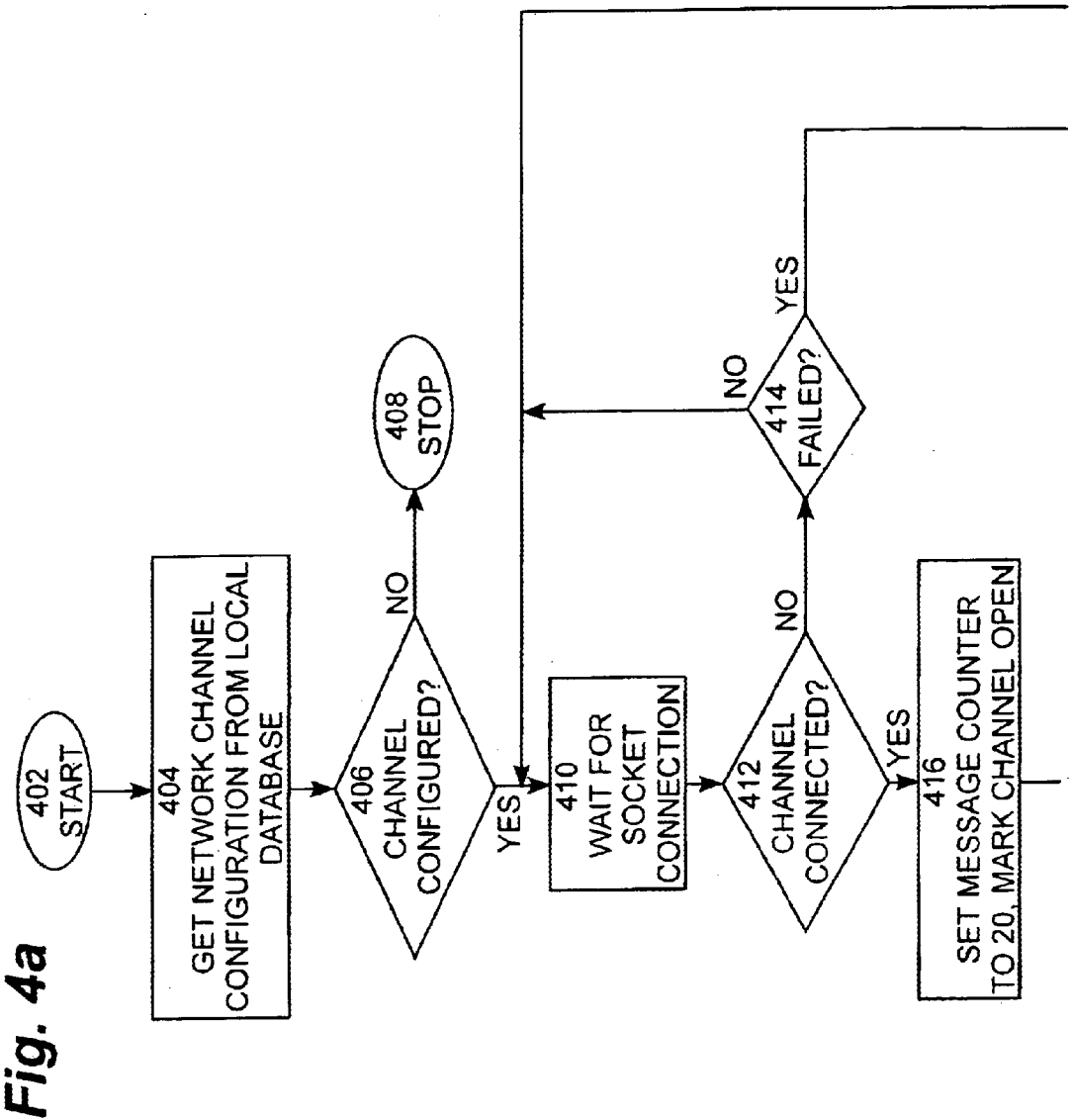
Figure 4B:
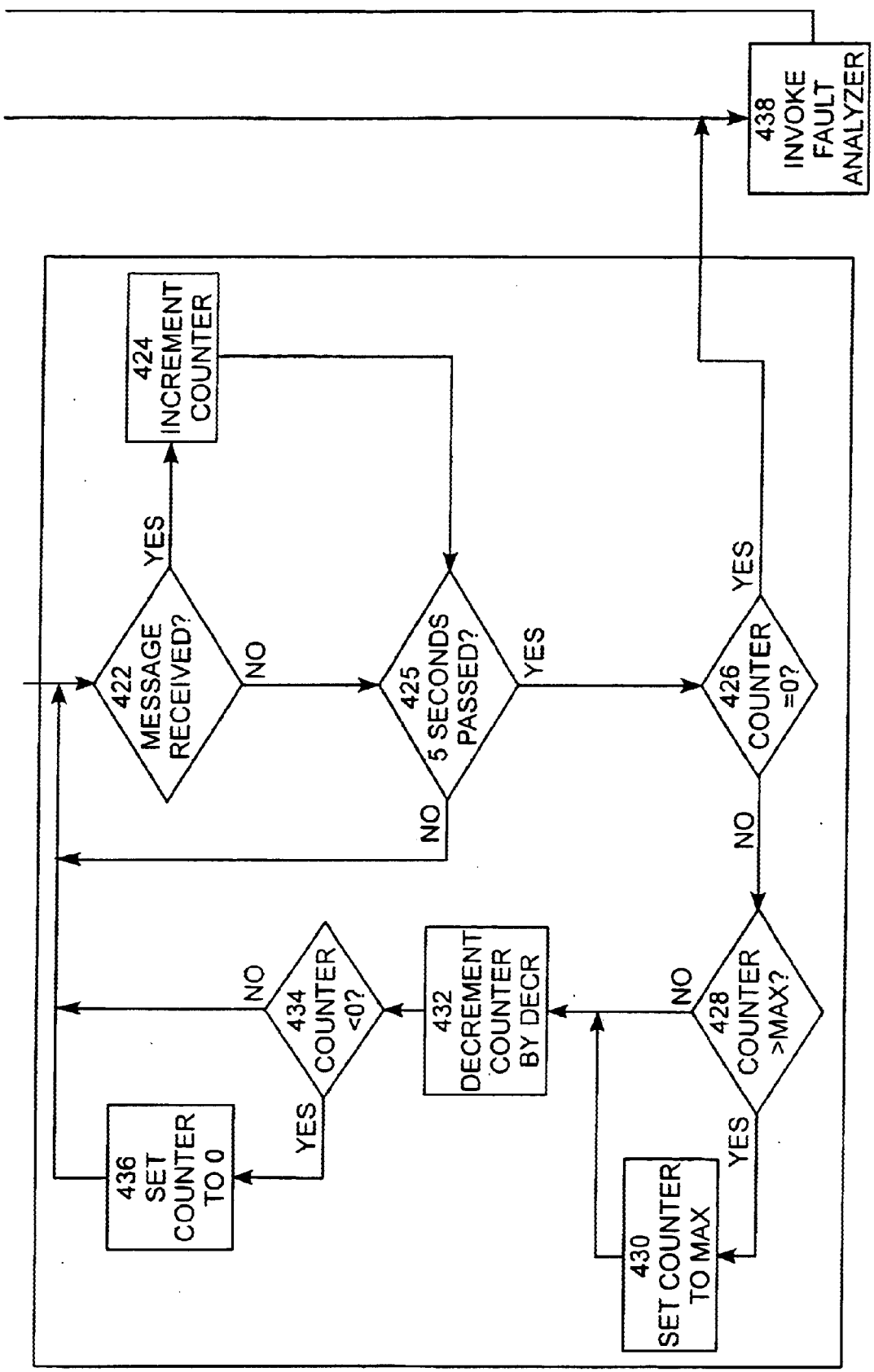

FIG. 6 depicts a flow diagram of a fault analysis process 600, i.e., the fault analyzer that is invoked at step 438 of FIG. 4. The fault analysis process 600 is performed in a distributed fashion, where a portion of the analysis is performed on the local SCM and a portion of the analysis is performed on the remote SCM (if possible). The fault analysis is intended to determine if the fault of a channel is a result of a network error or the fault of an SCM. A given channel comprises the local SCM system software, the local SCM NIC, a network cable, a network switch, a second network cable, a remote SCM NIC, and the remote SCM's system software. Any one of these components can cause a channel fault. The fault analysis routine gathers information from both SCMs, determines the cause of the fault and derives a solution to the problem.

The fault analysis routine 600 starts at step 602 and proceeds to step 604. At step 604, the routine queries whether all the channels are faulted, i.e., have the counter values of all counters attained zero. If the query of step 604 is answered affirmatively, the routine 600 deems the remote SCM to have failed. At step 606, the failure is reported to a system operator and a fault analysis is not executed. The routine then stops at step 608.

If less than all the channels have failed (i.e., at least one operative channel is available for communication between SCMS), the routine proceeds from step 604 to step 610. At step 610, the fault analysis routine 600 queries whether the SCM that has invoked the fault analyzer is a master SCM. Since the master SCM controls the fault analysis process, a slave SCM must request the master SCM to request a distributed fault analysis. As such, if the query at step 610 is negatively answered, the process 600 proceeds to step 612. At step 612, the SCM that invoked the fault analyzer contacts the remote SCM to request a distributed fault analysis. Then, at step 608, the process stops.

If the SCM that invoked the fault analyzer is the master SCM, the process 600 proceeds from step 610 to invoke a distributed fault analysis at step 620. An event trace for the distributed fault analysis is depicted in FIG. 7 and described below.

At step 622, the SCM that invokes a distributed fault analysis contacts the remote SCM to request a recalculation of a QOS metric.

The quality of service metric is a measure of the level of service that the local and remote SCM are providing to the network. At step 622, the local and remote QOS metrics are compared. At step 624, the local SCM recalculates a local QOS metric or metrics as described with respect to the event trace of FIG. 8. At step 626, the local SCM requests and receives from the remote SCM a quality of service (QOS) metric. At step 628, the local SCM sends its QOS metrics to the remote SCM. At step 632, the routine 600 compares the QOS metrics of the local SCM to the QOS metrics of the remote SCM.

The routine 600 then invokes a failover decision routine 900 that analyzes the QOS metrics of the local and remote SCMs to determine if a failover is warranted. At step 634, the routine 600 queries whether the local QOS exceeds the remote QOS. If the answer is affirmative, the routine proceeds to step 636. At step 636, the routine queries whether the QOS of the local SCM indicates that the local SCM can handle the resources and duties of the remote SCM. If the query is affirmatively answered, the routine proceeds to step 638 where the remote SCM is failed and a failover process is invoked.

If the QOS of the local SCM is insufficient to support the resources and duties of the remote SCM, the routine proceeds to step 640 and does nothing.

If at step 634, the query is negatively answered the routine proceeds to step 642. At step 642, the queries whether the QOS of the remote SCM indicates that the remote SCM is capable of supporting the resources and duties of the local SCM. IF not, the routine proceeds to step 640 and does nothing. If the QOS is sufficient for the remote SCM to support the resources and duties of the local SCM, the routine invokes a failover process for the local SCM at step 644. The routine then stops at step 608. The failover decision routine 900 is disclosed in detail below with respect to FIG. 9.

FIG. 7 depicts a flow diagram that represents the operation of the distributed fault analysis. When a distributed fault analysis is desired, either the remote or local SCM can call the process. The illustrative embodiment depicted in FIG. 7 shows the local SCM 702 initiating the distributed fault analysis process. At step 708, the message monitor 706 detects a failure and requests a fault analysis. At step 712, the local SCM 702 contacts a fault server task 710 of the remote SCM 704 to request analysis. Once contact is established, at step 714, both the local and remote SCMs 702, 704 perform the local fault analysis routine described below. At step 716, the SCMs 702, 704 exchange the results of their local analyses. At step 718, both SCMs couple the local analysis results to the decision routine (described below with respect to FIG. 9) to decide whether the local SCM 702 or the remote SCM 704 should failover or if nothing should be done.

FIG. 8 depicts a flow diagram of a local fault analysis routine 800. The local fault analysis procedure 800 comprises two components: a receiver task 803 and a sender task 804. The receiver task, at step 806, builds a list of local networks and opens a raw socket to each of the local networks. The receiver task 806 then, at step 808, invokes the sender task 804. At step 810, the sender task 804 builds a ICMP echo request and sends ICMP echo requests. Each ICMP request is sent to a different network. Each ICMP request includes information identifying the target network. At step 812, the sender task then sleeps for a short period, e.g., one second. Upon waking at step 814, the sender task 804 sends a second group of ICMP echo requests onto the networks, i.e., one request on each network. At steps 816 and 818, the process of sleeping and waking repeats to send another group of echo requests on the networks. This process repeats a number of times, e.g., three. As such, each network receives several ICMP echo requests, each separated by a short period, and the sender task 804 completes in a bounded time regardless of the number of networks.

At step 820, the receiver task 802 sleeps until awoken by the reception of a reply to one of the echo requests. The networks that reply to the echo request are deemed operational, while those that do not reply may be deemed failed.

FIG. 9 is a flow diagram of the decision routine 900 used to decide whether an SCM requires failover. The routine 900 begins at step 902 and proceeds to step 904 where the routine computes configured network bitfields for both the local and the remote SCMs. At step 906, the configured network bitfields are compared. At step 908, the routine queries whether the configured network bitfields match. If the bitfields do not match the routine deems that a configuration error has resulted and the remote SCM is faulted. The routine stops at step 912.

If the configured network bitfields match, the routine 900 proceeds from step 908 to step 914. At step 914, the routine compares the configured network bitfield to a configuration mask. The configuration mask identifies all the network connections that should be active and operational (not faulted). At step 916, the routine computes a status bitfields that represent the status of both the local and remote SCMs, i.e., the status bitfield will show network connections that are faulted and which network connections are not faulted. At step 918, the routine compares the local status bitfield to the configuration mask. At step 920, the routine queries whether the local bitfield and mask match. If a match does not exist, the differences are saved at step 922 and the routine proceeds to step 924. If a match exists, the routine proceeds directly from step 920 to step 924.

At step 924, the routine 900 compares the remote status bitfield to the configuration mask. At step 1026, the routine 900 queries whether a match exists. If no match exists, the differences are saved at step 939 and the routine proceeds to step 927. If a match exists the routine proceeds to step 927. At step 927, the routine queries whether the configuration mask matched with the local and remote status bitfields. If the query is affirmatively answered, the decision routine decides to do nothing and stops at step 928. However, if one of the status bitfields do not match the configuration mask, the routine proceeds to step 922.

At step 922, the routine 900 analyzes the differences between the status bitfields and the configuration mask to determine whether the remote or local SCM is to be faulted. If one or more local networks have failed and none have failed for the remote SCM, then the local SCM is deemed failed. If one or more remote networks have failed and none of the local networks have failed, then the remote SCM is deemed to have failed.

At step 934, the routine 900 queries which of the SCMs has faulted. If the local SCM has faulted, the routine proceeds to step 936 where the local SCM is identified as failed. If the remote SCM has faulted, the routine proceeds to step 938 where the remote SCM is identified as failed. If both SCMs have faulted, then the routine 900 decides to do nothing. The routine 900 then stops at step 940. The decision routine 900 only identifies an SCM as failed in view of uncontroverted evidence that one SCM has failed and the other is fully operational. If both SCMs have faults, the decision is to do nothing. Other embodiments of the invention may involve, causing a failover to the lesser faulted SCM.

Although various embodiments which incorporate the teachings of the present invention have been shown and described in detail herein, those skilled in the art can readily devise many other varied embodiments that still incorporate these teachings.

What is claimed is:

1. Apparatus for monitoring the status of multiple devices comprising:
   a first status message generator located in a first device;
   a second status message generator located in a second device;
   a first status monitor located in said second device;
   a second status monitor located in said first device;
   a communication network coupling said first device to said second device using a plurality of communications channels;
   where said first status message generator periodically transmits status messages to said first status monitor using said plurality of communications channels and said second status message generator transmits status messages to said second status monitor using said plurality of communications channels; and
   wherein said first and second status message generators comprise means for producing a status message, means for periodically transmitting the status message on said plurality of communications channels, and a disconnect counter for identifying a socket error and means for opening a new socket in response to an error.

2. The apparatus of claim 1 wherein said status messages are sent at 1 second intervals.

3. The apparatus of claim 1 wherein the first and second status monitor comprises:
   a fault analyzer to determine which, if any, device has failed.

4. The apparatus of claim 3 wherein said fault analyzer comprises:
   means for performing a distributed fault analysis by collecting status information from each of the devices.

5. The apparatus of claim 1 wherein said devices are storage controller modules coupled to a storage pool.

6. Apparatus for monitoring the status of multiple devices comprising:
   a first status message generator located in a first device;
   a second status message generator located in a second device;
   a first status monitor located in said second device;
   a second status monitor located in said first device;
   a communications network coupling said first device to said second device using a plurality of communications channels;
   where said first status message generator periodically transmits status messages to said first status monitor using said plurality of communications channels and said second status message generator transmits status messages to said second status monitor using said plurality of communications channels;
   wherein said first and second status message monitors comprise means for opening a plurality of communications sockets, means for counting a number of received status messages, and means for invoking a fault analysis if the number of received status messages is less than a predefined number on at least one of the communications channels in said plurality of communications channels; and
   wherein said means for counting comprises a counter that is initialized to a predefined number, means for incrementing the counter when a status message is received, and means for decrementing a counter on a periodic basis.

7. Apparatus for monitoring the status of multiple devices comprising:
   a first status message generator located in a first device;
   a second status message generator located in a second device;
   a first status monitor located in said second device;
   a second status monitor located in said first device;
   a communications network coupling said first device to said second device using a plurality of communications channels;
   where said first status message generator periodically transmits status messages to said first status monitor using said plurality of communications channels and said second status message generator transmits status messages to said second status monitor using said plurality of communications channels;
   means for determining a quality of service metric for said first and second devices; and
   means for comparing at least one quality of service metric of said first device to the quality of service metric of said second device to determine if either said first or second devices should failover.

8. The apparatus of claim 7 wherein said quality of service information is shared by said first and second devices.

9. A network of storage system comprising:
   a first storage control module comprising a first status message generator and a second status message monitor;
   a second storage control module comprising a second status message generator and a first status message monitor;
   at least one storage array coupled to both said first and second storage control modules;
   a communications network coupling said first storage control module to said second storage control module using a plurality of communications channels;
   where said first status message generator periodically transmits status messages to said second status monitor using a plurality of communications channels and said second status message generator transmits status messages to said first status monitor using a plurality of communications channels; and
   wherein said first and second status message generators comprise means for producing a status message, means for periodically transmitting the status message on said plurality of communications channels, and a disconnect counter for identifying a socket error and means for opening a new socket in response to an error.

10. A method of monitoring the status of multiple devices comprising:
    periodically generating and transmitting status messages from a first status monitor to a second status monitor using a plurality of communications channels;
    periodically generating and transmitting status messages from a second status monitor to a first status monitor using said plurality of communications channels, where said first or second status monitors invoke a failure analysis if a predefined number of status messages are not received on a communications channel;
    identifying a socket error and opening a new socket in response to an error, wherein said identifying step further comprises setting a counter to a predefined value and decrementing the counter after each message is transmitted.

11. The method of claim 10 wherein said status messages are transmitted at 1 second intervals.

12. The method of claim 10 further comprising:

invoking a fault analyzer to determine which, if any, device has failed.

13. The method of claim 12 wherein said fault analyzer comprises:

performing a distributed fault analysis by collecting status information from each of the devices.

14. The method of claim 10 wherein said devices are storage controller modules coupled to a storage pool.

15. A method of monitoring the status of multiple devices comprising:

periodically generating and transmitting status messages from a first status monitor to a second status monitor using a plurality of communications channels;

periodically generating and transmitting status messages from a second status monitor to a first status monitor using a plurality of communications channels, where said first or second status monitors invoke a failure analysis if a predefined number of status messages are not received on a communications channel;

opening a plurality of communications sockets;

counting a number of received status messages, wherein said counting step comprises initializing a counter to a predefined number, incrementing the counter when a status message is received, and decrementing a counter on a periodic basis; and invoking a fault analysis if the number of received status messages is less than a predefined number on at least one of the communications channels in said plurality of communications channels.

* * * * *